United States Patent Office 3,592,659
Patented July 13, 1971

3,592,659
METHOD OF AGGLOMERATING FROZEN PARTICLES
John W. Clancy, Shrub Oak, and Reuben H. Waitman, Pearl River, N.Y., assignors to General Foods Corporation, White Plains, N.Y.
No Drawing. Filed Mar. 19, 1969, Ser. No. 808,667
Int. Cl. A23f 1/08
U.S. Cl. 99—71                                  5 Claims

ABSTRACT OF THE DISCLOSURE

A method of agglomerating surface-meltable particles has been discovered. The method is particularly useful as a means of processing fines created when extracts are frozen and ground either for packaging in the frozen state or preparatory to freeze drying. The surface-meltable particles are allowed to fall freely past a compressed air nozzle which is used to direct a turbulent, expanding stream of warm air at the particles. The hot air causes a surface thawing and the particles stick to each other in the form of tacky agglomerates. The air stream is also used to blow the particles into a cold atmosphere within which they instantly resolidify, thus binding together the agglomerates.

BACKGROUND OF THE INVENTION

This invention relates to agglomeration of solid particles whose surface can be liquified by application of heat and rapidly resolidified by chilling. More particularly it relates to the preparation of frozen and ground extracts in particulate form suitable for packaging as frozen foods or for freeze drying. The process of this invention is also a novel means of handling the frozen fines created when frozen extract is ground.

Research in the frozen food industry is constantly seeking new products and product forms which will attract and benefit the consumer. One type of product form being considered is frozen particles wherein the consumer can spoon out a desired quantity of product without the need to thaw the entire contents of the container. Products in granular form are particularly useful. However, when preparing the product from an initial liquid the standard techniques would be to freeze the liquid and grind the frozen liquid. Inherently, fines are produced in the grinding operation. These fines are undesirable as they tend to melt more easily than larger particles and cause spoilage on storage. In order to overcome this difficulty some means of separating and reprocessing the finer particles is necessary. One means of accomplishing this would be to melt and rework the fines. However, when processing a product with heat sensitive flavor components, this type of treatment often downgrades quality.

Developments in the field of freeze drying have led most manufacturers to prepare products for freeze drying in particulate form. As above, when starting with a liquid which is frozen and ground, fines are inherently formed. These fines tend to cause difficulties in subsequent operations such as loading carriers with frozen granules, as the fines coat the equipment causing mechanical failures and making it difficult to maintain satisfactory sanitary conditions. Also, the fines tend to be entrained in the freeze dryer and represent a large fraction of product losses in the freeze drying operation.

SUMMARY OF THE INVENTION

It has now been discovered that surface-meltable fines can be handled in a manner analogous to conventional steam agglomeration and the fines can be agglomerated and processed as agglomerates. When the product to be processed is extract, it is frozen and ground and then subjected to a physical separation wherein the finer particles are separated out. These frozen fines are then fed to a warm air stream which causes the surface of the particles to thaw. The surface-thawed particles cling to each other forming agglomerates (as do particles exposed to a steam nozzle in a conventional agglomeration system). The warm air is also used to direct the flow of particles into a cold atmosphere wherein the particles are caused to almost instantaneously refreeze. The frozen agglomerates can then be combined with the larger particles and further processed, e.g. packaged as a frozen food or loaded into product carriers for freeze drying.

The process has the advantage of never completely melting the frozen fines, thus protecting product quality. Also, processing difficulties encountered with fines are essentially eliminated.

As used in this application, surface-meltable is used to refer to a material whose surface can be rendered tacky by subjecting it to hot air stream and can be resolidified very rapidly on exposure to cold temperature. Thus, the definition is meant to include metals for sintering, plastics, fatty materials such as baking chocolate, butter and "dry" shortenings, nut and seed meals, egg yolks, dry salad dressing mixes and extracts.

Extract is meant to include water solutions obtained from natural products such as oranges or roasted coffee. In addition, it is used in broader sense to include any water solution of components which can be subsequently treated as extracts for purpose of preparing frozen or freeze dried products.

Grinding as used in this application is intended to mean any means of subdividing a frozen extract into particulate pieces such as slicing, cutting, crushing, etc.

DESCRIPTION OF THE PREFERRED EMBODIMENT

An extract to be treated by the process of this invention is frozen, preferably on a continuous freezing belt to produce a continuous slab of frozen material. When processing coffee extract, the product has been successfully frozen on a Sandvik freezing belt to a temperature well below its eutectic point of about $-15°$ F.

The frozen product is then ground into pieces having a desired particle size and shape. Commonly, a continuous slab is broken into pieces which can conveniently be fed into a series of mills. The grinding operation is carried out in a cold atmosphere, typically at $-30°$ to $-40°$ F., in order to insure that the product will remain frozen.

In practicing the process of this invention, the ground product may be classified to effectively remove fines prior to further processing. This classification will also be performed at temperatures of less than $-30°$ F. in order to prevent product melting. The ground product can be readily classified via a screening operation, wherein everything passing through a designated screen is agglomerated by the process of this invention. When processing coffee extract, it is the pieces which pass through a U.S. No. 40 screen which should be separated and a No. 40 screen would be a logical selection for the screening operation. However, it has been found that the finer screens tend to blind more frequently, and it is desirable to use a screen with somewhat larger openings. However, it has been found that large particles, i.e. those retained on a U.S. No. 12 screen, do not tend to agglomerate well by the process of this invention. Also, the larger particles are generally satisfactory for further processing. Therefore, it is preferred to use a screen with openings larger than those in a U.S. No. 40 screen but not greater than a U.S. No. 12 screen for frozen coffee extract.

Alternatively, the fines separation can be accomplished by any other physical means adoptable to use in a cold atmosphere. Thus, a cyclone separator can be conveniently used, and the equipment can be designed to remove particles below a given size.

The frozen fines are then fed into the warm air stream. A falling stream of particles is desired at this point and it has been found that a vibrating feeder is very adaptable to use at this point of the process. The warm air is blown out of a compressed air nozzle and the direction of the air may be generally perpendicular to the falling particles. It has been found that a degree of turbulence should be created by the air stream which will cause the particles to make the necessary contacts while directing the path of flow. Alternatively, two or more air nozzles can be used in order to more accurately propel the falling particles in a given direction. The air flow and temperature are readily adjusted to supply sufficient heat to cause the surface of the particles to thaw without melting the entire particle. This surface-thawing causes the particles to become tacky and the contacting particles in the stream form into clusters or agglomerates.

The warm air stream directs the particles into a cold atmosphere of less than −30° F. wherein the falling agglomerates tend to refreeze completely, almost instantaneously. The frozen agglomerates are then collected and mixed with the main stream of larger particles for further processing.

It is preferred, in carrying out the process of this invention, to perform all of the operations in a cold atmosphere. This can be accomplished by having the entire process carried out in a large cold room. When processing frozen extracts, the temperature may be maintained at less than −30° F. In this manner, the warm air stream will dissipate in the cold atmosphere, and the agglomerates will continue to fall through the cold room to a collection vessel or belt. It is desirable to use a forced air chilling system to maintain the cold atmosphere necessary to prevent melting of the particles, other than surface-thawing when they are exposed to the warm jet of air.

While the process of this invention has been described as a means of handling fines created in grinding frozen extract, it is also useful as a process for producing a 100% agglomerated product. Thus, the frozen extract can be ground such that all of the particles pass through a U.S. No. 12 screen (or smaller if desired) and the entire stream of frozen particles can then be agglomerated according to the process of this invention.

The process of this invention will be further described by reference to the following example.

EXAMPLE

Coffee extract containing 35% solids by weight of the extract was frozen into ½ inch slabs in trays. The frozen slabs were broken into approximately 2 inch pieces and fed into a large, refrigerated, stainless steel Waring Blendor operated at high speed and pulverized briefly. All of the product was passed through a U.S. No. 12 screen and the larger pieces were further pulverized to pass through the screen. The ground product was fed from a vibrating feeder past the nozzle of a hand model heat gun. The particles underwent a surface-thaw and stuck together in the form of agglomerates. The agglomerates were carried in a horizontal direction by the warm air stream for a distance of about 6 ft. and were collected as they fell into a plastic lined drum. All of the above operations were carried out in a cold room maintained at from −30° to −40° F.

It was observed that the finer particles had formed agglomerates and that some of the larger pieces and fines had formed agglomerates, but that the larger pieces, +20 mesh, did not tend to stick to each other.

The agglomerates were spread out in trays and transferred to a vacuum freeze drying chamber wherein they were subjected to a standard freeze drying cycle. The resultant dry product had a desirable low density, a dark color and was essentially free of dust. When redissolved, there was significantly less foaming than with standard spray dried coffee.

The foregoing example is for illustrative purposes only. As indicated, the process is applicable to a wide variety of products which can be surface-thawed and then resolidified by chilling. The process of this invention is intended to be limited only by the appended claims.

We claim:
1. A method of producing agglomerates with heat sensitive flavor components comprising the steps of:
   (a) freezing a liquid extract containing heat sensitive flavor components,
   (b) grinding the frozen extract into particles,
   (c) feeding frozen extract particles into a warm air stream,
   (d) melting the surface of said frozen particles without melting the entire particle by means of said warm air stream,
   (e) creating sufficient turbulence by means of said warm air stream to cause the particles to move into close proximity to each other thus contacting each other and forming agglomerates,
   (f) blowing said agglomerates by means of said warm air stream into a cold atmosphere to solidify the agglomerates, and
   (g) collecting the solidified agglomerates.
2. The method of claim 1 wherein the agglomerates are freeze dried after collection.
3. The method of claim 2 wherein the cold atmosphere is maintained at −30° F. maximum.
4. The method of claim 2 wherein the particles are frozen coffee extract and wherein the particles to be agglomerated pass through a U.S. No. 12 screen.
5. The method of claim 4 wherein the particles are capable of passing through a U.S. No. 40 screen.

References Cited
UNITED STATES PATENTS

| | | | |
|---|---|---|---|
| 2,900,256 | 8/1959 | Scott | 99 Agglom Dig. |
| 2,957,771 | 10/1960 | Prater | 99 Agglom Dig. |
| 3,120,438 | 2/1964 | McIntire et al. | 99 Agglom Dig. |
| 3,143,428 | 8/1964 | Reimers et al. | 99 Agglom Dig. |
| 3,275,449 | 9/1966 | Fritzberg | 99 Agglom Dig. |
| 3,485,637 | 12/1969 | Adler et al. | 99 Agglom Dig. |

FRANK W. LUTHER, Primary Examiner

W. L. MENTLIK, Assistant Examiner

U.S. Cl. X.R.

99—192, 199; 62—63